United States Patent
Moon et al.

(10) Patent No.: US 10,669,450 B2
(45) Date of Patent: *Jun. 2, 2020

(54) FLEXIBLE DISPLAY DEVICE

(71) Applicants: SAMSUNG SDI CO., LTD., Yongin-si, Gyeonggi-do (KR); SAMSUNG ELECTRONICS CO., LTD., Suwon-si, Gyeonggi-do (KR)

(72) Inventors: Hyung Rang Moon, Uiwiang-si (KR); Ji Ho Kim, Uiwiang-si (KR); Il Jin Kim, Uiwiang-si (KR); Byeong Do Kwak, Uiwiang-si (KR); Jee Hee Kim, Uiwiang-si (KR); Sung Hyun Mun, Uiwiang-si (KR); Seon Hee Shin, Uiwiang-si (KR); Gwang Hwan Lee, Uiwiang-si (KR); Woo Jin Lee, Uiwiang-si (KR); Eun Hwa Lee, Uiwiang-si (KR); Ik Hwan Cho, Uiwiang-si (KR); Jae Hyun Han, Uiwiang-si (KR)

(73) Assignees: Samsung SDI Co., Ltd., Yongin-si (KR); Samsung Electronics Co., Ltd., Suwon-si (KR)

( * ) Notice: Subject to any disclaimer, the term of this patent is extended or adjusted under 35 U.S.C. 154(b) by 96 days.

This patent is subject to a terminal disclaimer.

(21) Appl. No.: 15/522,253

(22) PCT Filed: Oct. 30, 2015

(86) PCT No.: PCT/KR2015/011603
§ 371 (c)(1),
(2) Date: Apr. 26, 2017

(87) PCT Pub. No.: WO2016/068661
PCT Pub. Date: May 6, 2016

(65) Prior Publication Data
US 2017/0321087 A1  Nov. 9, 2017

(30) Foreign Application Priority Data

Nov. 1, 2014 (KR) .................. 10-2014-0150799
Nov. 1, 2014 (KR) .................. 10-2014-0153211

(Continued)

(51) Int. Cl.
*C09J 4/00*  (2006.01)
*G06F 3/041*  (2006.01)
(Continued)

(52) U.S. Cl.
CPC ................. *C09J 4/00* (2013.01); *C09J 7/20* (2018.01); *C09J 7/22* (2018.01); *C09J 7/255* (2018.01);
(Continued)

(58) Field of Classification Search
CPC ................ C09J 133/14; C09J 133/066; C09J 7/38–387; C09J 4/00; C08F 22/26; C08F 222/26; G06F 1/1652; G06F 3/044
See application file for complete search history.

(56) References Cited

U.S. PATENT DOCUMENTS 5,162,432 A  11/1992  Machado
6,291,593 B1  9/2001  Cheng
(Continued)

FOREIGN PATENT DOCUMENTS

CN  1763112 A  4/2006
CN  1764679 A  4/2006
(Continued)

OTHER PUBLICATIONS

International Search Report for corresponding PCT Application No. PCT/KR2015/011603, dated Mar. 31, 2016, with English Translation (4 pages).

(Continued)

*Primary Examiner* — Kregg T Brooks
(74) *Attorney, Agent, or Firm* — Lewis Roca Rothgerber Christie LLP

(57) ABSTRACT

A flexible display device of the present invention comprises a photoelectric element part; a first adhesive film formed on the photoelectric element part; a touch function part formed on the first adhesive film; a second adhesive film formed on the touch function part; and a window film formed on the second adhesive film; wherein the first adhesive film or the second adhesive film has an average slope of about −9.9 to about 0 at −20° C. to 80° C. based on x-axis for the distribution of storage modulus versus temperature in the (Continued)

function of x-axis of temperature (° C.) and y-axis of storage modulus (KPa) and wherein the first adhesive film or the second adhesive film has a storage modulus of about 10 KPa or more at 80° C.

27 Claims, 4 Drawing Sheets

(30) Foreign Application Priority Data

Nov. 11, 2014 (KR) ........................ 10-2014-0156463
Oct. 29, 2015 (KR) ........................ 10-2015-0150670

(51) Int. Cl.
| | | |
|---|---|---|
| C09J 7/25 | (2018.01) | |
| C09J 7/20 | (2018.01) | |
| G06F 1/16 | (2006.01) | |
| C09J 133/08 | (2006.01) | |
| C09J 7/38 | (2018.01) | |
| C09J 133/14 | (2006.01) | |
| G06F 3/044 | (2006.01) | |
| C09J 11/06 | (2006.01) | |
| C09J 7/22 | (2018.01) | |
| G02F 1/1333 | (2006.01) | |

(52) U.S. Cl.
CPC ............... *C09J 7/38* (2018.01); *C09J 11/06* (2013.01); *C09J 133/08* (2013.01); *C09J 133/14* (2013.01); *G02F 1/13338* (2013.01); *G06F 1/1652* (2013.01); *G06F 3/041* (2013.01); *G06F 3/044* (2013.01); *G06F 3/0412* (2013.01); *C09J 2203/318* (2013.01); *C09J 2203/326* (2013.01); *C09J 2433/00* (2013.01); *C09J 2467/006* (2013.01); *G06F 2203/04102* (2013.01); *G06F 2203/04103* (2013.01)

(56) References Cited

U.S. PATENT DOCUMENTS

| | | |
|---|---|---|
| 2005/0154140 A1 | 7/2005 | Hong et al. |
| 2005/0181148 A1 | 8/2005 | Kim et al. |
| 2007/0149715 A1 | 6/2007 | Lee et al. |
| 2009/0179035 A1 | 7/2009 | Agarwal et al. |
| 2009/0298969 A1 | 12/2009 | Attarwala et al. |
| 2012/0100359 A1 | 4/2012 | Kishioka et al. |
| 2013/0052457 A1 | 2/2013 | Inui et al. |
| 2014/0065416 A1 | 3/2014 | Niwa et al. |
| 2014/0139447 A1* | 5/2014 | Kang ............... G06F 3/044 345/173 |
| 2014/0162044 A1 | 6/2014 | Lee et al. |
| 2014/0267950 A1 | 9/2014 | Kang et al. |
| 2016/0122600 A1* | 5/2016 | Moon ............... C09J 133/14 428/354 |
| 2016/0177146 A1 | 6/2016 | Mun et al. |
| 2017/0002237 A1* | 1/2017 | Cho ............... C09J 133/08 |
| 2017/0015880 A1* | 1/2017 | Kim ............... C09J 7/22 |

FOREIGN PATENT DOCUMENTS

| | | |
|---|---|---|
| CN | 101679709 A | 3/2010 |
| CN | 102753635 A | 10/2012 |
| CN | 102855822 A | 1/2013 |
| CN | 102933677 A | 2/2013 |
| CN | 103160217 | 6/2013 |
| CN | 103328526 A | 9/2013 |
| CN | 103865411 A | 6/2014 |
| CN | 103897620 A | 7/2014 |
| CN | 104231952 A | 12/2014 |
| CN | 106010318 A | 10/2016 |
| JP | H09-278837 A | 10/1997 |
| JP | 2006-301572 A | 11/2006 |
| JP | 2007-176542 A | 7/2007 |
| JP | 2008-037101 A | 2/2008 |
| JP | 4750410 B2 | 8/2011 |
| KR | 10-2005-0056158 A | 6/2005 |
| KR | 10-2007-0055363 A | 5/2007 |
| KR | 10-2008-0052897 A | 6/2008 |
| KR | 10-2010-0002638 A | 1/2010 |
| KR | 10-2010-0075726 A | 7/2010 |
| KR | 10-2012-0125699 A | 11/2012 |
| KR | 10-2014-0076425 A | 6/2014 |
| KR | 10-2014-0085259 A | 7/2014 |
| KR | 10-2014-0085299 A | 7/2014 |
| KR | 10-2014-0090737 A | 7/2014 |
| KR | 10-2014-0102132 A | 8/2014 |
| KR | 10-2014-0111884 A | 9/2014 |
| KR | 10-2014-0148278 A | 12/2014 |
| KR | 10-2016-0030235 A | 3/2016 |
| TW | 200724635 A | 7/2007 |
| TW | 201300474 A1 | 1/2013 |
| TW | 201300478 A | 1/2013 |
| TW | 201420715 A | 6/2014 |
| TW | 201430085 A | 8/2014 |
| TW | 201430091 A | 8/2014 |
| WO | WO 2012/124908 A2 | 9/2012 |
| WO | WO 2012/138030 A1 | 10/2012 |
| WO | WO 2013/176364 A1 | 11/2013 |
| WO | WO 2014/027788 A1 | 2/2014 |
| WO | WO 2015/155844 A1 | 10/2015 |

OTHER PUBLICATIONS

Written Opinion for corresponding PCT Application No. PCT/KR2015/011603, dated Mar. 31, 2016, with English Translation (5 pages).
European Search Report for corresponding European Application No. 15854252.2, European Search Report dated May 14, 2018 (14 pgs.).
Taiwan Office action dated Sep. 9, 2016, corresponding to Taiwanese Patent Application No. 104135962 (7 pages).
TIPO Office action dated Dec. 7, 2016, corresponding to Taiwanese Patent Application No. 105110178 (13 pages).
Korean Office Action dated May 22, 2017, corresponding to Korean Application No. 10-2015-0093811 (8 pgs.).
Taiwan Office action dated Aug. 9, 2017, corresponding to Taiwan Application No. 105120402 (9 pages).
Chinese Office Action dated Dec. 18, 2017, corresponding to Chinese Patent Application No. 201510729509.4 (9 pages).
Chinese Office Action dated Jun. 4, 2018, corresponding to Chinese Patent Application No. 201610191474.8 (9 pages).
Chinese Office action dated Nov. 2, 2018, corresponding to Chinese Patent Application No. 201610491631.7 (11 pgs.).
Korean Office Action dated Jan. 28, 2019, corresponding to Korean Patent Application No. 10-2016-0170837 (5 pgs.).
U.S. Office Action dated May 3, 2017, issued in U.S. Appl. No. 15/198,977 (11 pages).
U.S. Office Action dated May 17, 2017, issued in U.S. Appl. No. 15/084,361 (17 pages).
U.S. Office Action dated May 19, 2017, issued in U.S. Appl. No. 14/973,312 (19 pages).
U.S. Office Action dated Jul. 26, 2017, issued in U.S. Appl. No. 14/923,520 (10 pages).
U.S. Office Action dated Mar. 5, 2018, issued in U.S. Appl. No. 14/976,408 (18 pages).
U.S. Office Action dated May 16, 2018, issued in U.S. Appl. No. 14/923,520 (7 pages).
U.S. Final Office Action dated Oct. 4, 2018, issued in U.S. Appl. No. 14/929,160 (11 pages).
U.S. Office Action dated Oct. 17, 2018, issued in U.S. Appl. No. 15/491,699 (10 pages).
U.S. Final Office Action dated Jan. 17, 2019, issued in U.S. Appl. No. 15/198,977 (13 pages).

(56) References Cited

OTHER PUBLICATIONS

China Office Action from corresponding Chinese Application No. 2015-80058757.9, Chinese Office Action dated Jul. 2, 2019 (9 pgs.).
China Office Action from corresponding China Application No. 201710269050.3, China Office action dated Oct. 12, 2019 (9 pgs.).
English translation of China Office Action from corresponding China Application No. 201710269050.3, China Office action dated Oct. 12, 2019 (8 pgs.).

* cited by examiner

[Figure 1]
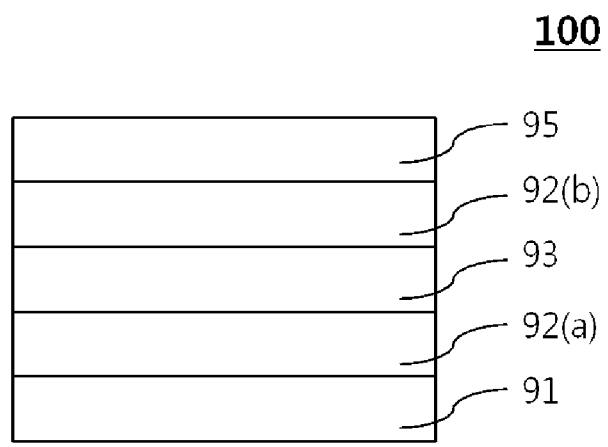

[Figure 2]
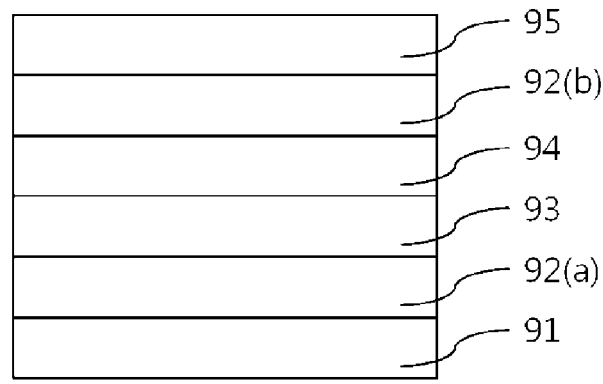
[Figure 3]
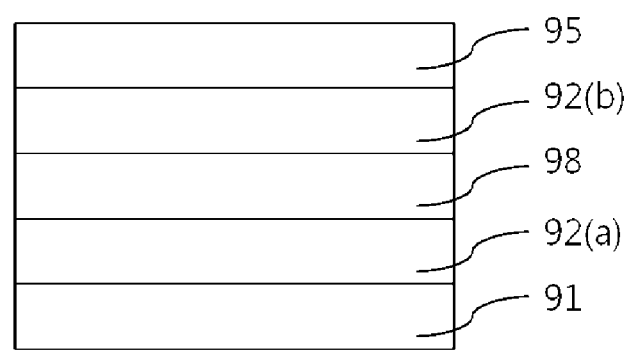

[Figure 4]
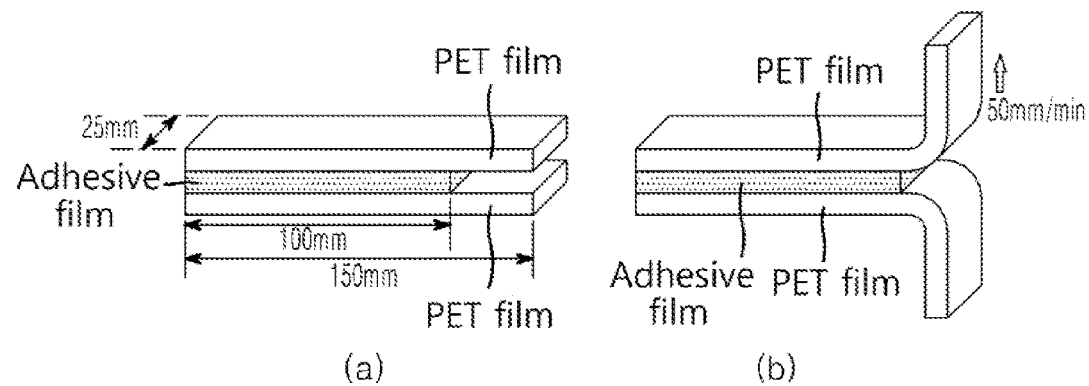

[Figure 5]
(a)
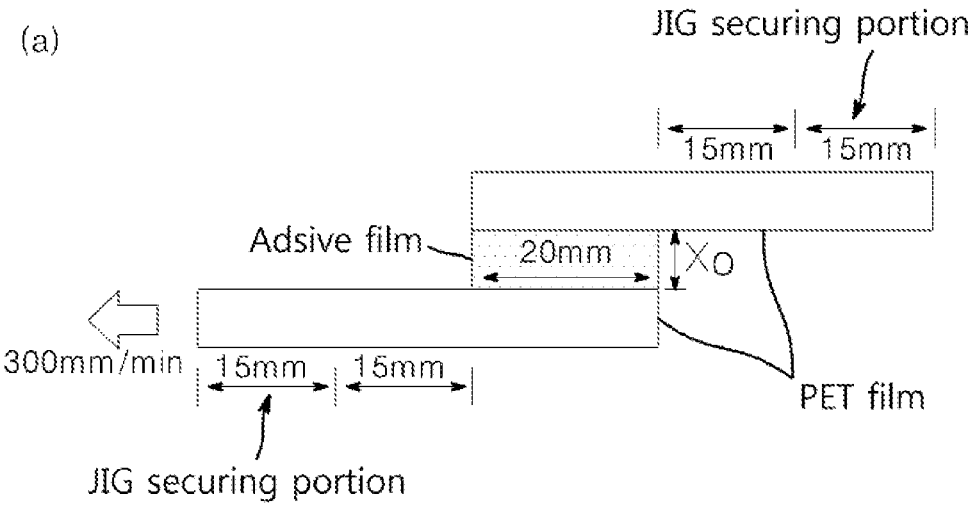
(b)
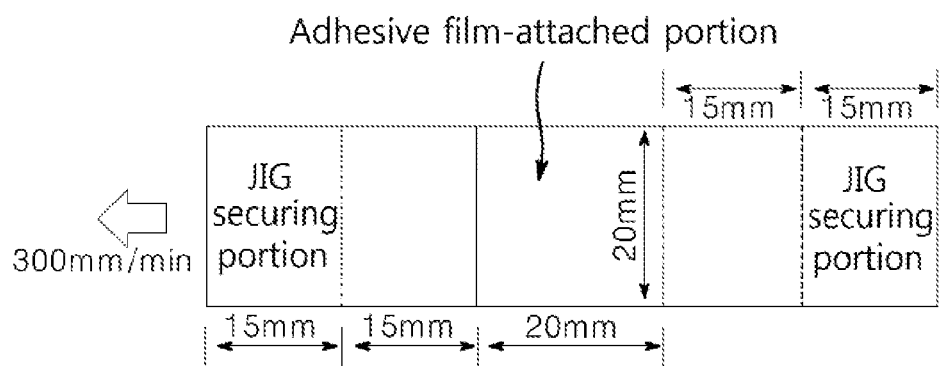

FLEXIBLE DISPLAY DEVICE

This application is a National Phase patent application and claims priority to and the benefit of International Application Number PCT/KR2015/011603, filed on Oct. 30, 2015, which claims priority to and the benefit of Korean Application No. 10-2014-0153211, filed on Nov. 1, 2014, Korean Application No. 10-2014-0150799, filed on Nov. 1, 2014, Korean Application No. 10-2014-0156463 filed on Nov. 11, 2014, and Korean Application No. 10-2015-0150670 filed on Oct. 29, 2015, the entire contents of each of which are incorporated herein by reference.

BACKGROUND

1. Field

The present invention relates to a flexible display device.

2. Description of the Related Art

Recently, glass substrates or high hardness substrates have been replaced with films in optical display devices such as liquid crystal display devices, organic light emitting diode display devices, and the like. Thus, flexible display devices having flexibility, which can be folded and unfolded, have been developed. As the films are used as a substrate in the flexible display devices, it has an advantage that it is thin and light, and has high impact resistance, and can be folded and unfolded thus fabricated in a various form.

The flexible display devices have a structure in which a window films are laminated on display elements. An optical clear adhesive (OCA) film is intervened between the display elements and window films.

The usage environments, storage environments and/or preparation environments, and the like of the optical display devices have recently been harsh. In addition, a variety of physical properties that has been required as a concern on the flexible optical display devices have been gradually increased. Particularly, to apply them to the flexible displays, the OCA films capable of maintaining viscoelasticity property in wide temperature range and having excellent recovery property are required.

Japanese Laid-Open Patent No. 2007-176542 discloses the background of the present invention.

SUMMARY

The object of the present invention is to provide a flexible display device having excellent quality by applying an adhesive film having excellent viscoelasticity property and recovery property.

The other object of the present invention is to provide a flexible display device capable of maintaining excellent reliability and durability even though in the harsh usage environments, storage environments and/or preparation environments.

These and other objects of the present invention will be achieved by using aspects of the present invention described below.

In one aspect of the present invention, provided is a flexible display device. In one embodiment the flexible display device including a photoelectric element part; a first adhesive film formed on the photoelectric element part; a touch function part formed on the first adhesive film; a second adhesive film formed on the touch function part; and a window film formed on the second adhesive film; wherein the first adhesive film or the second adhesive film has an average slope of about −9.9 to about 0 at −20° C. to 80° C. of x-axis for the distribution of storage modulus versus temperature in the function of x-axis of temperature (° C.) and y-axis of storage modulus (KPa) and the first adhesive film or the second adhesive film may have a modulus of about 10 KPa or more at 80° C.

In another embodiment the flexible display device including a photoelectric element part; a first adhesive film formed on the photoelectric element part; a touch function part formed on the first adhesive film; a second adhesive film formed on the touch function part; and a window film formed on the second adhesive film; wherein the first adhesive film or the second adhesive film is formed from an pressure-sensitive adhesive composition including a monomer mixture for a (meth)acrylic copolymer having a hydroxyl group; and organic particles, and the organic particles have an average particle diameter of 10 nm to 400 nm.

The flexible display device may further include a polarizer formed on the touch function part or on the first adhesive film.

The touch function part may include a substrate layer, and the substrate layer may include a polarizer.

The photoelectric element part may be an OLED, a LED or a LCD including a light source.

The first adhesive film may have a thickness greater than that of the second adhesive film.

The first adhesive film or the second adhesive film may have a T-peel strength of about 400 gf/in to about 5,000 gf/in, as measured at 25° C. with respect to a corona-treated polyethylene terephthalate (PET) film.

The first adhesive film or the second adhesive film may have a T-peel strength of about 200 gf/in to about 3,000 gf/in, as measured at 60° C. with respect to a corona-treated polyethylene terephthalate (PET) film.

The first adhesive film or the second adhesive film may have a storage modulus of about 10 KPa to about 1000 KPa at 80° C.

The first adhesive film or the second adhesive film may have a storage modulus of about 10 KPa to about 1000 KPa at −20° C.

The first adhesive film or the second adhesive film may have a haze of about 5% or less after 200% stretching at a thickness of 100 μm.

The first adhesive film or the second adhesive film may have a recovery rate of about 30% to about 98% at a thickness of 100 μm according to following Equation 1.

$$\text{Recovery rate (\%)} = (1 - (X_f/X_0)) \times 100 \qquad \text{[Equation 1]}$$

(where in equation 1, when both ends of each of polyethylene terephthalate (PET) films (thickness: about 75 μm) having a size of about 50 mm×about 20 mm (length×width) are defined as a first end and a second end, respectively, a specimen is prepared by bonding ends of two PET films to each other via an adhesive film having a size of about 20 mm×about 20 mm (length×width) in order of first end of first PET film/adhesive film (length×width: about 20 mm×about 20 mm)/second end of second PET film. Next, jigs are secured to non-bonded ends of the PET films of the specimen, respectively. Next, the jig at one side is kept fixed and the jig at the other side is pulled to a length (about 10 times of thickness, $X_0$) of about 1,000% of thickness (unit: μm) of the adhesive film of the adhesive film at a rate of about 300 mm/min and then maintained for about 10 seconds. When a force of about 0 kPa is applied to the adhesive film by recovering the adhesive film at the same rate (about 300 mm/min) as the pulling rate, an increased length of the adhesive film is defined as $X_f$ (unit: μm)).

The first adhesive film or the second adhesive film may have an elongation of about 800% to about 2000%.

The first adhesive film or the second adhesive film may have a bubble generation area of about 0%, as measured when the adhesive film (about 13 cm×about 3 cm, about thickness of about 100 μm) comprising a about 50 μm thick PET film stacked on one surface thereof and a about 100 μm thick PET film stacked on the other surface thereof is bent towards the about 50 μm thick PET film such that the adhesive film has ½ of the length, followed by placing the adhesive film between parallel frames having a gap of about 1 cm, and then subjected to aging under conditions of about 70° C. and humidity of about 93% for about 24 hours.

The first adhesive film or the second adhesive film in the flexible display device may have a bubble generation area of 0%, as measured when the flexible display device that a window film was replaced with PET film (thickness of about 100 μm), bended into the parallel frames having a spacing of about 1 cm in the direction of the photoelectric element part, and aging at temperature of about 70° C. and humidity of about 93% for about 24 hours.

The first adhesive film or the second adhesive film may be a cured product of the pressure-sensitive adhesive composition, and the pressure-sensitive adhesive composition may include a monomer mixture for a (meth)acrylic copolymer having a hydroxyl group, and organic particles.

The organic particles may have an average particle diameter of about 10 nm to about 400 nm.

The monomer mixture including a (meth)acrylate monomer having the hydroxyl group and a comonomer.

The organic particles may have core-shell structures, and a glass transition temperature of the core and the shell may satisfy the following Equation 2.

$$Tg(c) < Tg(s) \qquad \text{[Equation 2]}$$

(Where in equation 2, Tg(c) is a glass transition temperature (° C.) of the core, and Tg(s) is a glass transition temperature (° C.) of the shell).

The core may have a glass transition temperature of about −150° C. to about 10° C., and the shell may have a glass transition temperature of about 15° C. to about 150° C.

The core may include at least one polyalkyl (meth) acrylate having a glass transition temperature of about −150° C. to about 10° C., and the shell may include at least one polyalkyl (meth)acrylate having a glass transition temperature of about 15° C. to about 150° C.

The core or the shell may include two or more of layers, and the outermost layer of the organic particles may include at least one polyalkyl (meth)acrylate having a glass transition temperature of about 15° C. to about 150° C.

The shell may be present in an amount of about 1 wt % to about 70 wt % in the organic particles.

The organic particles may be present in an amount of about 0.1 parts by weight to about 15 parts by weight based on 100 parts by weight of the monomer mixture for the (meth)acrylic copolymer having the hydroxyl group.

The organic particles may have a refractive index difference of about 0.05 or less from that of the (meth)acrylic copolymer having the hydroxyl group.

The (meth)acrylic copolymer having the hydroxyl group may be the polymer of about 60 wt % to about 95 wt % of the comonomer and about 5 wt % to about 40 wt % of the (meth)acrylate having the hydroxyl group.

The comonomer may include at least one of an alkyl (meth)acrylate monomer, a monomer having ethylene oxide, a monomer having propylene oxide, a monomer having amine group, a monomer having amide group, a monomer having alkoxy group, a monomer having phosphate group, a monomer having sulfonic acid group, a monomer having phenyl group and a monomer having silane group, and the comonomer may have a glass transition temperature (Tg) of about −150° C. to about 0° C.

The pressure-sensitive adhesive composition may further include at least one of an initiator and a crosslinking agent.

In accordance with aspects of the present invention, provided is a flexible display divice capable of maintaining excellent reliability and durability and having excellent quality even though in the harsh usage environments, storage environments and/or preparation environments by applying an adhesive film having excellent viscoelasticity property and recovery property.

BRIEF DESCRIPTION OF THE DRAWINGS

FIG. 1 is a sectional view of a flexible display device according to one embodiment of the present invention.

FIG. 2 is a sectional view of a flexible display device according to another embodiment of the present invention.

FIG. 3 is a sectional view of a flexible display device according to still another embodiment of the present invention.

FIG. 4 is a conceptual diagram of a specimen for measuring T-peel strength.

FIG. 5 shows sectional and plan views of a specimen for measuring recovery rate.

DETAILED DESCRIPTION

Embodiments of the present invention will be described in detail with reference to the accompanying drawings. It should be understood that the present invention may be embodied in different ways and is not limited to the following embodiments. In the drawings, portions irrelevant to the description will be omitted for clarity. Like components will be denoted by like reference numerals throughout the specification.

As used herein, terms such as "upper" and "lower" are defined with reference to the accompanying drawings. Thus, it will be understood that the term "upper" can be used interchangeably with the term "lower." The term "on" encompasses both that one element is disposed "directly on" another structure, and that the other structure can be interposed. Meanwhile, the term "directly on" means that the other structure is not interposed.

As used herein, the term "(meth)acryl" refers to acryl and/or methacryl.

As used herein, the term "copolymer" includes oligomers, poymers, or resins.

As used herein, the term "comonomer" is not limited, but may be a monomer which can be polymerized with a (meth)acrylate having a hydroxyl group.

As used herein, the "glass transition temperature" may be determined, for example, on a homopolymer of each monomer to be measured using a DSC Discovery from TA Instruments. Specifically, the glass transition temperature may be determined on the homopolymer of each monomer by increasing the temperature to about 180° C. at a rate of 20° C./min and allowing it cool slowly to −80° C., thereby the data of an endothermic transition curve at time which the temperature increases to 180° C. at a rate of 10° C./min, and the point of inflection of the endothermic transition curve may be taken as the glass transition temperature.

The term "foaming area of adhesive film" used herein means a value measured on an adhesive film specimen prepared by transferring the adhesive film (about 13 cm×about 3 cm, thickness of about 100 μm) to a PET film having a thickness of about 50 μm, and adhering the PET substrate having a thickness of about 100 μm to the back side of the adhesive film. The adhesive film specimen is bended and putted into the parallel frames having a spacing of about 1 cm in the direction of PET having a thickness of 50 μm such that the width length of the specimen of the adhesive film becomes about ½, and aged at temperature of about 70° C. and humidity of about 93% for about 24 hours. Then, the images of the area, in which the bubbles occur, taken with an optical microscope (Olympus, EX-51) are analyzed using a Mac-view software from Mountech Co., Ltd., to calculate a ratio (%) of the area and size in which the bubbles occupy to the area of the specimen.

The term "foaming area of display device" used herein means a value measured by specimen prepared by transferring the window film of the flexible display device to a PET film (thickness of about 100 μm), thereby specimen is bended and putted into the parallel frames having a spacing of about 1 cm in the direction of the PET film, and aging at temperature of about 70° C. and humidity of about 93% for about 24 hours, and analyzing the images of the display device taken with an optical microscope (Olympus, EX-51) using a Mac-view software from Mountech Co., Ltd., to calculate a ratio (%) of the area and size in which the bubbles occupy to the area of the display device.

The term "average particle diameter of organic particles" used herein means a Z-average value measured in an aqueous or organic solvent using a Zetasizer nano-ZS equipment from Malvern Ltd.

The term "core-shell structure" used herein refers to a typical core-shell structure. In addition, the core or the shell refers to monolayer or multi-layer, respectively, and the "outermost layer" refers to the most outer layer in a number of layers.

The term "elongation" may be determined by rolling closely the adhesive film of a thickness 100 μm and a size of about 5 cm×about 5 cm, and fixing it to the both ends of a TA (TA.XT Plus Texture Analyzer (Stable Micro Systems, Ltd)), then stretching it at a rate of about 300 mm/min, and elongation means a ratio of the length before the stretching to the length at time which the adhesive film breaks by stretching (elongation).

As used herein, the term "T-peel strength" refers to a value measured by the following procedures of i) to v):

i) An adhesive composition is coated onto a polyethylene terephthalate (PET) release film, followed by UV irradiation at a dose of about 2000 mJ/cm$^2$, thereby manufacturing an about 100 μm thick adhesive sheet of an adhesive film and the PET film.

ii) A PET film, which has a size of about 150 mm×about 25 mm×about 75 μm (length×width×thickness) and is subjected to corona treatment twice (total dose: about 156) under corona discharge at a dose of about 78 using a corona treatment device, is prepared.

iii) An adhesive film sample having a size of about 100 mm×about 25 mm×about 100 μm (length×width×thickness) is obtained from the adhesive sheet, followed by laminating the corona-treated surfaces of the PET films to both surfaces of the adhesive film sample, thereby preparing a specimen, as shown in FIG. 4(a).

iv) The specimen is subjected to autoclaving under conditions of about 3.5 bar and about 50° C. for about 1,000 seconds and secured to a TA.XT_Plus texture analyzer (Stable Micro System Co., Ltd.).

v) In the TA.XT_Plus texture analyzer, the PET film at one side is kept fixed and the PET film at the other side is pulled at a rate of about 50 mm/min, thereby measuring T-peel strength (see FIG. 4(b)).

Herein, the "recovery rate" can be measured through the following procedures: When both ends of each polyethylene terephthalate (PET) film (thickness: about 75 μm) having a size of about 50 mm×about 20 mm (length×width) are defined as a first end and a second end, respectively, a specimen is prepared by bonding ends of two PET films to each other via an adhesive film having a size of about 20 mm×about 20 mm (length×width) in order of first end of first PET film/adhesive film/second end of second PET film, and has a contact area of about 20 mm×about 20 mm (length×width) between each of the PET films and the adhesive film (see FIGS. 5(a) and 5 (b)). Referring to FIG. 5(a), jigs are secured to non-bonded ends of the PET films of the specimen at room temperature (about 25° C.), respectively. Next, the jig at one side is kept fixed, and the jig at the other side is pulled as much as a length of about 1,000% of thickness (unit: μm) of the adhesive film (10 times an initial thickness ($X_0$) of the adhesive film) at a rate of about 300 mm/min and then maintained for about 10 seconds. Next, if an increased length of the adhesive film is defined as $X_f$ (unit: μm) when a force of about 0 kPa is applied to the adhesive film by recovering the adhesive film at the same rate (300 mm/min) as the pulling rate, the recovery rate (%) is calculated by Equation 1:

$$\text{Recovery rate } (\%) = (1 - (X_f/X_0)) \times 100 \qquad \text{[Equation 1]}$$

Here, the initial thickness of the adhesive film may range from about 20 μm to about 300 μm.

Recovery rate may be measured using a TA.XT_Plus texture analyzer (Stable Micro System Co., Ltd.). Recovery rate may be measured at about 25° C. to about 80° C.

Hereinafter, a flexible display device of the present invention will be described with reference to FIG. 1. FIG. 1 is a flexible display device according to one aspect of the present invention.

Referring to FIG. 1, a flexible display device 100 of the present invention may include a photoelectric element part (91), a first adhesive film (92(a)) formed on the photoelectric element part (91), a touch function part (93) formed on the first adhesive film (92(a)), a second adhesive film (92(b)) formed on the touch function part (93) and a window film (95) formed on the second adhesive film (92(b)).

In some embodiments, the first adhesive film (92(a)) or the second adhesive film (92(b)) may have an average slope of about −9.9 to about 0 at −20° C. to 80° C. based on x-axis for the distribution of storage modulus versus temperature in the function of x-axis of temperature (° C.) and y-axis of storage modulus (KPa). The average slope may be specifically from about −9.9, −9.5, −9, −8.5, −8, −7.5, −7, −6.5, −6, −5.5, −5, −4.5, −4, −3.5, −3, −2.5, −2, −1.5, −1, −0.5 or 0. In addition, the first adhesive film (92(a)) or the second adhesive film (92(b)) may have equal, more or less average slope of among the above mentioned examples. The average slope may be specifically about −5 to about 0, more specifically about −2 to about 0. Within this range, the adhesive film may exhibit viscoelasticity property at a wide temperature range, and have excellent recovery rate, and thus can be used for the flexible display device.

The average slope means an average slope at −20° C. to 80° C. based on x-axis for the distribution of storage modulus versus temperature of the adhesive film, in which a temperature (° C.) is plotted as x-axis and a storage modulus (KPa) is plotted as y-axis, and is calculated according to Equation 3:

$$\text{Average slope} = (Mo(80°\ C.) - Mo(-20°\ C.))/(80-(-20)) \quad \text{[Equation 3]}$$

(Where in equation 3, Mo (80° C.) is a storage modulus at 80° C., and Mo (−20° C.) is a storage modulus at −20° C.)

The first adhesive film (92(*a*)) or the second adhesive film (92(*b*)) may have a storage modulus of about 10 KPa or more at 80° C. For example, the first adhesive film (92(*a*)) or the second adhesive film (92(*b*)) may be about 10, 20, 30, 40, 50, 60, 70, 80, 90, 100, 150, 200, 250, 300, 350, 400, 450, 500, 550, 600, 650, 700, 750, 800, 850, 900, 950 or 1000 Kpa. In addition, the first adhesive film (92(*a*)) or the second adhesive film (92(*b*)) may have equal, more or less storage modulus at 80° C. of among the above mentioned examples. Specifically, the first adhesive film (92(*a*)) or the second adhesive film (92(*b*)) may have a about 10 KPa to about 1000 KPa, specifically about 10 KPa to about 800 KPa, and more specifically about 10 KPa to about 100 KPa at 80° C. Within this range, the adhesive film may have excellent viscoelasticity (elastic) property and recovery rate at a high temperature.

To improve peel strength of the first adhesive film (92(*a*)) or the second adhesive film (92(*b*)), a surface onto which the adhesive composition is coated may be subjected to surface treatment in advance, for example, corona pretreatment at about 150 mJ/cm². For example, corona pretreatment may be performed by treating a surface of an adherend (for example, a PET film) twice under corona discharge at a dose of about 78 using a corona treatment device (Now plasma Co., Ltd.), without being limited thereto.

The first adhesive film (92(*a*)) or the second adhesive film (92(*b*)) may have a T-peel strength of about 400 gf/in to about 5,000 gf/in at thickness of about 100 μm, as measured at room temperature (about 25° C.) with respect to a corona-treated polyethylene terephthalate (PET) film. For example, the first adhesive film or the second adhesive film may have a T-peel strength of about 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900 or 5000 gf/in. In addition, the first adhesive film (92(*a*)) or the second adhesive film (92(*b*)) may have a T-peel strength may have equal, more or less of among the above mentioned examples. Specifically, the first adhesive film (92(*a*)) or the second adhesive film (92(*b*)) may have a T-peel strength of about 500 gf/in to about 4,000 gf/in, more specifically about 700 gf/in to about 3,500 gf/in. Within this range, the first adhesive film or the second adhesive film may have excellent adhesion and reliability at a high temperature.

The first adhesive film (92(*a*)) or the second adhesive film (92(*b*)) may have a T-peel strength of about 200 gf/in to about 3,000 gf/in, as measured at 60° C. at thickness of 100 μm with respect to a corona-treated polyethylene terephthalate (PET) film. For example, the first adhesive film or the second adhesive film may have a T-peel strength of about 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900 or 3000 gf/in at thickness of 100 μm with respect to a corona-treated polyethylene terephthalate (PET) film at 60° C. In addition, the T-peel strength may have equal, more or less of among the above mentioned examples. Specifically, the first adhesive film or the second adhesive film may have a T-peel strength of about 500 gf/in to about 2,000 gf/in, more specifically about 500 gf/in to about 1,500 gf/in at thickness of 100 μm. Within this range, the first adhesive film or the second adhesive film may have excellent adhesion and reliability at a high temperature.

The T-peel strength of the adhesive film is measured as follows. A specimen is prepared by laminating corona-pretreated surfaces of PET films having a size of about 150 mm×about 25 mm×about 75 μm (length×width×thickness) to both surfaces of the adhesive film having a size of about 100 mm×about 25 mm×about 100 μm (length×width×thickness). Next, the specimen is subjected to autoclaving under conditions of about 3.5 bar and about 50° C. for about 1,000 seconds and then secured to a TA.XT_Plus texture analyzer (Stable Micro System Co., Ltd.). At 25° C. or 60° C., the PET film at one side is kept fixed and the PET film at the other side is pulled at a rate of about 50 mm/min, thereby measuring T-peel strength of the adhesive film with respect to the PET film. Corona pretreatment of the PET film may be performed, for example, by treating the PET film twice (total dose: about 156) under corona discharge at a dose of about 78 using a corona treatment device (Now plasma Co., Ltd.).

The first adhesive film (92(*a*)) or the second adhesive film (92(*b*)) may have a storage modulus of about 10 KPa or more, for example, about 10 KPa to about 1000 KPa, specifically about 10 KPa to about 800 KPa, and more specifically about 10 KPa to about 100 KPa at 80° C. Within this range, the adhesive film may have excellent viscoelasticity (elastic) property and recovery rate at a high temperature.

The first adhesive film (92(*a*)) or the second adhesive film (92(*b*)) may include an adhesive film having a storage modulus of about 10 KPa to about 1000 KPa, specifically about 10 KPa to about 800 KPa, and more specifically about 20 KPa to about 500 KPa at 25° C. Within this range, the adhesive film may have excellent viscoelasticity property and recovery rate at an ambient temperature.

The first adhesive film (92(*a*)) or the second adhesive film (92(*b*)) may include an adhesive film having a storage modulus of about 10 KPa to about 1000 KPa, specifically about 10 KPa to about 500 KPa, and more specifically about 20 KPa to about 500 KPa at −20° C. Within this range, when these are used in the flexible device at a low temperature, the adhesive film is flexible and has no whitening event, and thus can be used for the optical elements.

The first adhesive film (92(*a*)) or the second adhesive film (92(*b*)) may have a ratio of a storage modulus at 80° C. to a storage modulus at −20° C. of about 1:1 to about 1:10, for example, specifically about 1:1 to about 1:8, more specifically about 1:1 to about 1:5. Within this range, the adhesive film may have excellent adhesion between the adhesive and the adherent at a wide temperature range (−20° C. to 80° C.), and can be used for the flexible display device.

The first adhesive film (92(*a*)) or the second adhesive film (92(*b*)) may include an adhesive film having a haze of about 5% or less, specifically about 3% or less, and more specifically about 1% or less at a thickness of about 100 μm. Within this range, when the adhesive film is used in the display, it may exhibit excellent transparency.

The first adhesive film (92(*a*)) or the second adhesive film (92(*b*)) may have a haze of about 5% or less, specifically 3% or less, and more specifically 1% or less at a thickness of 100 μm after 200% stretching. Within this range, when the adhesive film is used in the display, it may exhibit excellent transparency.

The first adhesive film (92(*a*)) or the second adhesive film (92(*b*)) may include an adhesive film having a recovery rate from about 30% to about 98% at a thickness of about 100 μm. For example, the first adhesive film (92(*a*)) or the second adhesive film (92(*b*)) may include an adhesive film having a recovery rate from about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97 or 98% at a thickness of about 100 μm. In addition, the first adhesive film (92(*a*)) or the second adhesive film (92(*b*)) may include an adhesive film having a recovery rate of equal, more or less of among the above mentioned examples. Specifically, the recovery rate may be about 40% to about 95% at a thickness of 100 μm, as measured according to Equation 1. Within this range, the adhesive film may be used for the flexible display device, and have long shelf life.

$$\text{Recovery rate (\%)} = (1 - (X_f/X_0)) \times 100 \qquad \text{[Equation 1]}$$

(where in equation 1, when both ends of each of polyethylene terephthalate (PET) films (thickness: about 75 μm) are defined as a first end and a second end, respectively, a specimen is prepared by bonding ends of two PET films to each other via an adhesive film having a size of 20 mm×20 mm (length×width) in order of first end of first PET film/adhesive film (length×width: 20 mm×20 mm)/second end of second PET film. Next, jigs are secured to non-bonded ends of the PET films of the specimen, respectively. Next, the jig at one side is kept fixed and the jig at the other side is pulled to a length (about 10 times of thickness, $X_0$) of about 1,000% of thickness (unit: μm) of the adhesive film of the adhesive film at a rate of about 300 mm/min and then maintained for about 10 seconds. When a force of about 0 kPa is applied to the adhesive film by recovering the adhesive film at the same rate (300 mm/min) as the pulling rate, an increased length of the adhesive film is defined as $X_f$ (unit: μm)).

The first adhesive film (92(*a*)) or the second adhesive film (92(*b*)) may have an elongation of about 800% to about 2000% as measured by rolling closely the adhesive film of a size of about 5 cm×about 5 cm and a thickness of about 100 μm, and fixing it to the both ends of a TA (TA.XT Plus Texture Analyzer (Stable Micro Systems, Ltd)), and then stretching it at a rate of about 300 mm/min. Specifically, the adhesive film may have a ratio of the length at time which the adhesive film breaks to the length prior to stretching (elongation) of about 800% to about 2000%, specifically about 800% to about 1800%, and more specifically about 900% to about 1700%. Within this range, the adhesive film may be used for the flexible display device, and have excellent reliability.

The first adhesive film (92(*a*)) or the second adhesive film (92(*b*)) may have a bubble generation area of about 0%, as measured when the adhesive film of about 13 cm×about 3 cm, thickness 100 μm, comprising about 50 μm thick PET film stacked on one surface thereof and a about 100 μm thick PET film stacked on the other surface thereof is bent towards the about 50 μm thick PET film such that the adhesive film has about ½ of the length, followed by placing the adhesive film between parallel frames having a gap of about 1 cm, and then subjected to aging under conditions of about 70° C. and humidity of about 93% for about 24 hours. Within this range, the adhesive film may be used for the flexible display device, and have excellent reliability.

The first adhesive film (92(*a*)) or the second adhesive film (92(*b*)) in the flexible display device (100) may have a bubble generation area of 0%, as measured when the flexible display device that a window film was replaced with PET film (thickness of 100 μm), bended into the parallel frames having a spacing of 1 cm in the direction of the photoelectric element part, and aging at temperature of 70° C. and humidity of 93% for 24 hours. Within this range, the bubble may spread, diffuse, transfer or the like, then the bubble generation area reduced, thus the adhesive film and flexible display device have excellent reliability.

The first adhesive film (92(*a*)) or the second adhesive film (92(*b*)) may have a thickness of 1 μm to 2 mm, and specifically 50 μm to 1 mm. Within this range, the adhesive film may be used for the optical display device.

The first adhesive film (92(*a*)) or the second adhesive film (92(*b*)) may be formed by curing the pressure-sensitive adhesive composition. In other words, the first adhesive film (92(*a*)) or the second adhesive film (92(*b*)) may include a cured product of the pressure-sensitive adhesive composition.

The pressure-sensitive adhesive composition may include a (meth)acrylic copolymer having a hydroxyl group formed of monomer mixture, and organic particles.

The monomer mixture may include the (meth)acrylate monomer having the hydroxyl group and comonomer. And the (meth)acrylic copolymer having the hydroxyl group may be polymerized from a monomer mixture including the (meth)acrylate monomer having the hydroxyl group and comonomer.

The (meth)acrylate monomer having the hydroxyl group may be a (meth)acrylic ester having a $C_1$ to $C_{20}$ alkyl group having one or more hydroxyl groups, a (meth)acrylic ester having a $C_5$ to $C_{20}$ cycloalkyl group having one or more hydroxyl groups, or a (meth)acrylic ester having a $C_6$ to $C_{20}$ aryl group having one or more hydroxyl groups.

The (meth)acrylate monomer having the hydroxyl group may be, for example, but not limited thereto, at least one of 2-hydroxyethyl (meth)acrylate, 4-hydroxybutyl (meth)acrylate, 2-hydroxypropyl (meth)acrylate, 2-hydroxybutyl (meth)acrylate, or 6-hydroxyhexyl (meth)acrylate. Particularly, it is possible to further increase the adhesion by using a (meth)acrylic monomer having a $C_1$ to $C_5$ alkyl group having one or more hydroxyl groups.

The (meth)acrylic monomer having the hydroxyl group may be present in an amount of about 5 wt % to about 40 wt %, for example about 10 wt % to about 30 wt % in the monomer mixture. Within this range, the adhesive film may have reliability, and excellent adhesion.

The comonomer may be, for example, but not limited thereto, at least one of an alkyl (meth)acrylate monomer, a monomer having ethylene oxide, a monomer having propylene oxide, a monomer having amine group, a monomer having amide group, a monomer having alkoxy group, a monomer having phosphate group, a monomer having sulfonic acid group, a monomer having phenyl group and a monomer having silane group.

The alkyl (meth)acrylate monomer may include an unsubstituted linear or branched $C_1$ to $C_{20}$ alkyl (meth)acrylic ester. For example, the alkyl (meth)acrylate monomer may include at least one of methyl (meth)acrylate, ethyl (meth)acrylate, propyl (meth)acrylate, n-butyl (meth)acrylate, t-butyl (meth)acrylate, iso-butyl (meth)acrylate, pentyl (meth)acrylate, hexyl (meth)acrylate, heptyl (meth)acrylate, ethylhexyl (meth)acrylate, octyl (meth)acrylate, isooctyl (meth)acrylate, nonyl (meth)acrylate, decyl (meth)acrylate, or lauryl (meth)acrylate. Preferably, it is possible to further increase the initial adhesion by using a $C_4$ to $C_8$ alkyl (meth)acrylic monomer.

The monomer having ethylene oxide may include at least one of (meth)acrylate monomer containing ethylene oxide group (—CH$_2$CH$_2$O—). For example, the monomer may be, but not limited thereto, polyethylene oxide alkyl ether (meth)acrylate such as polyethylene oxide monomethyl ether (meth)acrylate, polyethylene oxide monoethyl ether (meth)acrylate, polyethylene oxide monopropyl ether (meth)acrylate, polyethylene oxide monobutyl ether (meth)acrylate, polyethylene oxide monopentyl ether (meth)acrylate, polyethylene oxide dimethyl ether (meth)acrylate, polyethylene oxide diethyl ether (meth)acrylate, polyethylene oxide monoisopropyl ether (meth)acrylate, polyethylene oxide monoisobutyl ether (meth)acrylate, polyethylene oxide mono tert-butyl ether (meth)acrylate, and the like.

The monomer having propylene oxide may be, but not limited thereto, a polypropylene oxide alkylether (meth)acrylate such as polypropylene oxide monomethyl ether (meth)acrylate, polypropylene oxide monoethyl ether (meth)acrylate, polypropylene oxide monopropyl ether (meth)acrylate, polypropylene oxide monobutyl ether (meth)acrylate, polypropylene oxide monopentyl ether (meth)acrylate, polypropylene oxide dimethyl ether (meth)acrylate, polypropylene oxide diethyl ether (meth)acrylate, polypropylene oxide monoisopropyl ether (meth)acrylate, polypropylene oxide monoisobutyl ether (meth)acrylate, polypropylene oxide mono tert-butyl ether (meth)acrylate, and the like.

The monomer having amino group may be, but not limited thereto, an amino group containing (meth)acrylic monomer such as monomethylaminoethyl (meth)acrylate, monoethylaminoethyl (meth)acrylate, monomethylaminopropyl (meth)acrylate, monoethylaminopropyl (meth)acrylate, dimethylaminoethyl (meth)acrylate, diethylaminoethyl (meth)acrylate, N-tert-butylaminoethyl (meth)acrylate, methacryloxyethyltrimethylammonium chloride (meth)acrylate, and the like.

The monomer having amide group may be, but not limited thereto, an amide group containing (meth)acrylic monomer such as (meth)acryl amide, N-methylacryl amide, N-methylmethacryl amide, N-methylol (meth)acryl amide, N-methoxymethyl (meth)acryl amide, N,N-methylene bis (meth)acryl amide, 2-hydroxyethylacryl amide, and the like.

The monomer having alkoxy group may be, but not limited thereto, 2-methoxy ethyl (meth)acrylate, 2-methoxypropyl (meth)acrylate, 2-ethoxypropyl (meth)acrylate, 2-buthoxypropyl (meth)acrylate, 2-methoxypentyl (meth)acrylate, 2-ethoxypentyl (meth)acrylate, 2-buthoxyhexyl (meth)acrylate, 3-methoxypentyl (meth)acrylate, 3-ethoxypentyl (meth)acrylate, or 3-buthoxyhexyl (meth)acrylate.

The monomer having phosphate group may be, but not limited thereto, a phosphate group containing acrylic monomer such as 2-methacryloyloxyethyldiphenyl phosphate (meth)acrylate, trimethacryloyloxyethyl phosphate (meth)acrylate, triacryloyloxyethyl phosphate (meth)acrylate, and the like.

The monomer having sulfonic acid group may be, but not limited thereto, a sulfonic acid group containing acrylic monomer such as sulfopropyl (meth)acrylate sodium, 2-sulfoethyl (meth)acrylate sodium, 2-acrylamido-2-methylpropane sulfonic acid sodium, and the like.

The monomer having phenyl group may be, but not limited thereto, a phenyl group containing acrylic vinyl monomer such as p-tert-butyl phenyl (meth)acrylate, o-biphenyl (meth)acrylate, and the like.

The monomer having silane group may be, but not limited thereto, a silane group containing vinyl monomer such as 2-acetoacetoxyethyl (meth)acrylate, vinyltrimethoxy silane, vinyltriethoxy silane, vinyl tris (β-methoxyethyl) silane, vinyltriacetyl silane, methacryloyloxypropyltrimethoxy silane, and the like.

The comonomer may be present in an amount of about 60 wt % to about 95 wt %, for example about 70 wt % to about 90 wt % in the monomer mixture. Within this range, the adhesive film may have excellent adhesion and reliability.

In another embodiment, the comonomer having a glass transition temperature (Tg) of −150° C. to 0° C. may be used. The glass transition temperature may be determined, for example, on a homopolymer of each monomer to be measured using a DSC Discovery from TA Instruments. Specifically, the glass transition temperature may be determined on the homopolymer of each monomer by increasing the temperature to about 180° C. at a rate of 20° C./min and allowing it cool slowly to −80° C., thereby the data of an endothermic transition curve at time which the temperature increases to 180° C. at a rate of 10° C./min, and the point of inflection of the endothermic transition curve may be taken as the glass transition temperature. The comonomer having a glass transition temperature (Tg) of −150° C. to 0° C. may be used without limitation as long as it has a glass transition temperature (Tg) of −150° C. to 0° C. Specifically, the monomer having a glass transition temperature (Tg) of −150° C. to −20° C., more specifically the monomer having a glass transition temperature (Tg) of −150° C. to −40° C. may be used.

In still another embodiment, the comonomer having a glass transition temperature (Tg) of −150° C. to 0° C., selected from an alkyl (meth)acrylate monomer, a monomer having ethylene oxide, a monomer having propylene oxide, a monomer having amine group, a monomer having amide group, a monomer having alkoxy group, a monomer having phosphate group, a monomer having sulfonic acid group, a monomer having phenyl group and a monomer having silane group may be used.

The comonomer may be, for example, at least one of an alkyl (meth)acrylate monomer such as methyl acrylate, ethyl acrylate, iso propyl acrylate, n-butyl acrylate, iso-butyl acrylate, hexyl (meth)acrylate, heptyl (meth)acrylate, 2-ethylhexyl acrylate, dodecyl (meth)acrylate, and the like; an alkylene oxide group containing (meth)acrylate monomer such as polyethylene oxide monomethyl ether (meth)acrylate, polyethylene oxide monoethyl ether (meth)acrylate, polyethylene oxide monopropyl ether (meth)acrylate, polyethylene oxide monobutyl ether (meth)acrylate, polyethylene oxide monopentyl ether (meth)acrylate, polypropylene oxide monomethyl ether (meth)acrylate, polypropylene oxide monoethyl ether (meth)acrylate, polypropylene oxide monopropyl ether (meth)acrylate, and the like; an amino group containing (meth)acrylate monomer such as monomethylaminoethyl (meth)acrylate, monoethylaminoethyl (meth)acrylate, monomethylaminopropyl (meth)acrylate, monoethylamino propyl (meth)acrylate, and the like; an alkoxy group containing (meth)acrylate monomer such as 2-methoxy ethyl (meth)acrylate, 2-methoxypropyl (meth) acrylate, 2-ethoxypropyl (meth)acrylate, 2-acetoacetoxyethyl (meth)acrylate, and the like; and a silane group containing (meth)acrylate monomer such as vinyltrimethoxy silane, vinyltriethoxy silane, and the like.

In some embodiments, the monomer mixture having may includes the (meth)acrylate monomer having the hydroxyl group and the monomer having a glass transition temperature (Tg) of −150° C. to 0° C. In this case, the monomer having a glass transition temperature (Tg) of −150° C. to 0° C. may be present in an amount of about 60 wt % to about 95 wt %, and for example, about 70 wt % to about 90 wt % in the monomer mixture. Within this range, the adhesive film may have excellent adhesion and reliability. The (meth) acrylic monomer having the hydroxyl group may be present in an amount of about 5 wt % to about 40 wt %, for example about 10 wt % to about 30 wt % in the monomer mixture. Within this range, the adhesive film may have low haze, and excellent adhesion.

In some embodiments, the monomer mixture may further include a monomer having a carboxy group.

The monomer having the carboxy group may be, for example, but not limited thereto, (meth)acrylic acid, 2-carboxyethyl (meth)acrylate, 3-carboxypropyl (meth)acrylate, 4-carboxybutyl (meth)acrylate, itaconic acid, crotonic acid, maleic acid, fumaric acid and anhydrous maleic acid, and the like.

For example, the monomer having the carboxy group may be further present in an amount of about 10 wt % or less, and in some embodiments about 7 wt % or less, specifically about 5 wt % or less, and more specifically 1 wt % or less in the monomer mixture. Within this range, the adhesive film may have high adhesion, and excellent reliability.

Since the pressure-sensitive adhesive composition or the adhesive film includes the organic particles, it has excellent viscoelasticity at a low temperature and/or at an room ambient temperature and crosslinked structure, and thus exhibits viscoelasticity stably at a high temperature. In some embodiments, the organic particles may form a chemical bond with the (meth)acrylic copolymer having the hydroxyl group.

In one embodiment, even though the pressure-sensitive adhesive composition or the adhesive film includes the organic particles, it has a certain refractive index difference with the organic particles having a certain average particle size described below and the (meth)acrylic copolymer having the hydroxyl group, thereby having excellent transparency.

The organic particles may have an average particle diameter of about 10 nm to about 400 nm, for example, about 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390 or 400. In addition, The organic particles may have an average particle diameter of equal, more or less of among the the above mentioned examples. Specifically, the organic particles may have an average particle diameter of 10 nm to 300 nm, and more specifically 10 nm to 200 nm. Within this range, it is possible to prevent aggregation of the organic particles, and achieve excellent transparency.

The organic particles may have a refractive index difference with the (meth)acrylic copolymer having the hydroxyl group of about 0.05 or less, specifically about 0 or more and about 0.03 or less, and specifically about 0 or more and about 0.02 or less. Within this range, the adhesive film may have excellent transparency.

The organic particles may have core-shell structures, and the glass transition temperature of the core and the shell satisfies the following Equation 2:

$$Tg(c)<Tg(s) \quad \text{[Equation 2]}$$

(wherein, Tg(c) is a glass transition temperature (° C.) of the core, and Tg(s) is a glass transition temperature (° C.) of the shell.)

Specifically, the core may have a glass transition temperature of about −150° C. to about 10° C., specifically about −150° C. to about −5° C., and more specifically about −150° C. to about −20° C. Within this range, it is possible to achieve a storage modulus value required at a low temperature (−20° C.), and excellent viscoelasticity property at a low temperature and/or at an ambient temperature.

Specifically, the core may include at least one polyalkyl (meth)acrylate having a glass transition temperature described above. For example, the core may include, but not limited thereto, at least one of polymethyl acrylate, polyethyl acrylate, polypropyl acrylate, polybutyl acrylate, polyisopropyl acrylate, polyhexyl acrylate, polyhexyl methacrylate, polyethylhexyl acrylate and polyethylhexyl methacrylate. Preferably, the core may include at least one of polybutyl acrylate and polyethylhexyl acrylate.

The shell may have a glass transition temperature of about 15° C. to about 150° C., specifically about 35° C. to about 150° C., and more specifically about 50° C. to about 140° C. Within this range, it may have excellent dispersibility of the organic particle in the (meth)acrylic copolymer having the hydroxyl group.

Specifically, the shell may include a polyalkyl (meth)acrylate having a glass transition temperature described above. For example, the shell may include, but not limited thereto, at least one of polymethyl methacrylate (PMMA), polyethyl methacrylate, polypropyl methacrylate, polybutyl methacrylate, polyisopropyl methacrylate, polyisobutyl methacrylate and polycyclohexyl methacrylate. For example, the shell may include polymethyl methacrylate.

In another embodiment, the core or the shell may include two or more layers, and the outermost layer of the organic particle may include at least one polyalkyl (meth)acrylate having a glass transition temperature of about 15° C. to about 150° C. Specifically, the core may include at least one polyalkyl (meth)acrylate having a glass transition temperature of about −150° C. to about 10° C., or alternatively include at least one polyalkyl (meth)acrylate without limitation in the glass transition temperature, but satisfying the glass transition temperature of the core to about −150° C. to about 10° C., but not limited thereto. In addition, the shell may include at least one polyalkyl (meth)acrylate having a glass transition temperature of about 15° C. to about 150° C., or alternatively include at least one polyalkyl (meth)acrylate without limitation in the glass transition temperature, but satisfying the glass transition temperature of the shell to about 15° C. to about 150° C., but not limited thereto.

The shell may be present in an amount of about 1 wt % to about 70 wt %, specifically about 5 wt % to about 60 wt %, and more specifically about 10 wt % to about 50 wt % in the organic particle. Within this range, it is possible to maintain viscoelasticity property at a wide temperature range, and achieve excellent recovery rate of the adhesive film.

In some embodiments, the organic particle may be present in an amount of about 0.1 parts by weight to about 15 parts by weight, specifically about 0.1 parts by weight to about 10 parts by weight, about 0.5 parts by weight to about 10 parts by weight, and more specifically about 0.1 parts by weight to about 8 parts by weight based on 100 parts by weight of the (meth)acrylic copolymer having the hydroxyl group. Within this range, it is possible to achieve a balance between viscoelasticity, storage modulus and recovery rate.

In one embodiment, the (meth)acrylic copolymer having the hydroxyl group may include a monomer mixture including a comonomer (for example, a comonomer having a glass transition temperature (Tg) from about −150° C. to about 0° C.) of about 60 wt % to about 95 wt %, and for example, about 70 wt % about 90 wt %, and a (meth)acrylic monomer having a hydroxyl group of about 5 wt % to about 40 wt %, for example, about 10 wt % to about 30 wt %. Within this range, the adhesive film may have excellent adhesion and reliability.

In another embodiment, the (meth)acrylic copolymer having the hydroxyl group may include a comonomer (for example, a comonomer having a glass transition temperature (Tg) of −150° C. to 0° C.) of about 60 wt % to about 95 wt %, for example, about 70 wt % to about 90 wt %, and a (meth)acrylic monomer having a hydroxyl group of about 5 wt % to about 40 wt %, for example, about 10 wt % to about 30 wt %, and the monomer having the carboxyl group may include the (meth)acrylic copolymer having the hydroxyl group of about 0 wt % to about 10 wt % or less, about 0.1 wt % to about 1 wt % in the monomer mixture. Within this range, the pressure-sensitive adhesive composition may have excellent adhesion and reliability.

In one embodiment, the organic particle in the pressure-sensitive adhesive composition may be used in the polymerized form with the monomer mixture when preparing the (meth)acrylic copolymer having the hydroxyl group. In this case, the organic particle may be used in the form included in the (meth)acrylic copolymer having the hydroxyl group.

In another embodiment, the pressure-sensitive adhesive composition may include the organic particle in combination with the already prepared (meth)acrylic copolymer having the hydroxyl group. In this case, the pressure-sensitive adhesive composition may include the organic particle in the different state from the (meth)acrylic copolymer having the hydroxyl group.

The (meth)acrylic copolymer having the hydroxyl group may have a glass transition temperature of about −150° C. to about −13° C., and specifically about −100° C. to about −20° C. Within this range, the adhesive film may have excellent foldability, as well as an excellent adhesion and reliability at a wide temperature range.

The (meth)acrylic copolymer having the hydroxyl group may be prepared specifically by mixing the monomer mixture and the organic particles with a radical photo-polymerizable initiator, followed by a solution polymerization, a suspension polymerization, a photo polymerization, a bulk polymerization, a dispersion polymerization or an emulsion polymerization. Alternatively, The (meth)acrylic copolymer having the hydroxyl group may be prepared by partially polymerizing the monomer mixture to obtain a prepolymer, and adding the organic particles into the prepolymer. Specifically, emulsion polymerization may be performed by adding an initiator to a dispersant, a crosslinking agent, the monomer mixture and the organic particles in an aqueous solution at 25° C. to 100° C.

In some embodiments, the pressure-sensitive adhesive composition may further include at least one of a crosslinking agent and an initiator.

The crosslinking agent may be, but not limited thereto, as a polyfunctional (meth)acrylate, for example a bifunctional acrylate such as 1,4-butanediol di(meth)acrylate, 1,6-hexanediol di(meth)acrylate, neopentylglycol di(meth)acrylate, polyethyleneglycol di(meth)acrylate, neopentylglycol adipate di(meth)acrylate, dicyclopentanyl di(meth)acrylate, caprolactone modified dicyclopentenyl di(meth)acrylate, ethylene oxide modified di(meth)acrylate, di (meth)acryloxyethyl isocyanurate, allylated cyclohexyl di(meth)acrylate, tricyclodecane dimethanol (meth)acrylate, dimethylol dicyclopentane di(meth)acrylate, ethylene oxide modified hexahydrophthalic acid di(meth)acrylate, tricyclodecane dimethanol (meth)acrylate, neopentylglycol modified trimethylpropane di(meth)acrylate, adamantane di(meth)acrylate or 9,9-bis[4-(2-acryloyloxyethoxy)phenyl]fluorene, and the like; a trifunctional acrylate such as trimethylolpropane tri(meth)acrylate, dipentaerythritol tri(meth)acrylate, propionic acid modified dipentaerythritol tri(meth)acrylate, pentaerythritol tri(meth)acrylate, propyleneoxide modified trimethylolpropane tri(meth)acrylate, trifunctional urethane (meth)acrylate or tris (meth)acryloxyethyl isocyanurate, and the like; a tetrafunctional acrylate such as diglycerine tetra (meth)acrylate or pentaerythritol tetra(meth)acrylate, and the like; a pentafunctional acrylate such as dipentaerythritol penta (meth)acrylate, and the like; and a hexafunctional acrylate such as dipentaerythritol hexa(meth)acrylate, caprolactone modified dipentaerythritol hexa(meth)acrylate or urethane (meth)acrylate (ex. hexa(meth)acrylate reactant of isocyanate monomer and trimethylolpropane tri(meth) acrylate), for example, reactant of isocyanate monomer and trimethylolpropane tri(meth)acrylate, and the like. These may be use alone or mixtures thereof. Preferably, the crosslinking agent may have excellent durability and reliability by using a polyfunctional (meth)acrylate of a polyhydric alcohol having 2-20 hydroxyl groups.

The crosslinking agent may be present in an amount of about 0.01 part by weight to about 10 parts by weight, specifically about 0.03 parts by weight to about 7 parts by weight, and specifically about 0.1 part by weight to about 5 parts by weight based on 100 parts by weight of the (meth)acrylic copolymer having the hydroxyl group. Within this range, the adhesive film may have excellent durability and an increase in reliability.

The initiator may be a photopolymerization initiator or a thermal polymerization initiator.

The initiator may be an initiator which is the same as or different from the initiator used in the preparation of the hydroxyl group-containing (meth)acrylic copolymer. In another embodiment, the initiator may be a thermal polymerization initiator.

The photopolymerization initiator may be any initiator so long as the initiator can realize a second crosslinking structure by deriving polymerization of the radical polymerizable compound during curing through light irradiation. For example, the photopolymerization initiator may include benzoin, hydroxyl ketone, amino ketone, phosphine oxide photoinitiators, and the like. Specifically, the photopolymerization initiator may include benzoin, benzoin methyl ether, benzoin ethyl ether, benzoin isopropyl ether, benzoin n-butyl ether, benzoin isobutyl ether, acetophenone, dimethylamino acetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholino-propan-1-one, 4-(2-hydroxyethoxy)phenyl-2-(hydroxy-2-propyl) ketone, benzophenone, p-phenylbenzophenone, 4,4'-bis(diethyl)aminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylaminobenzoic acid ester, oligo[2-hydroxy-2-methyl-1-[4-(1-methylvinyl)phenyl]propanone], and 2,4,6-trimethylbenzoyl-diphenyl-phosphine oxide, without being limited thereto. These photopolymerization initiators may be used alone or in combination thereof.

The thermal polymerization initiator may be any initiator without limitation so long as the initiator can realize a second crosslinking structure by deriving polymerization. For example, the thermal polymerization initiator may include typical initiators such as azo, peroxide and redox compounds. Examples of the azo compound may include 2,2-azobis(2-methylbutyronitrile), 2,2-azobis(isobutyronitrile), 2,2-azobis(2,4-dimethylvaleronitrile), 2,2-azobis-2-hydroxymethylpropionitrile, dimethyl-2,2-methylazobis(2-methylpropionate), and 2,2-azobis(4-methoxy-2,4-dimethylvaleronitrile) without being limited thereto. Examples of the peroxide compound may include: inorganic peroxides such as potassium perchlorate, ammonium persulfate and hydrogen peroxide; and organic peroxides such as diacyl peroxide, peroxydicarbonate, peroxyester, tetramethylbutyl peroxyneodecanoate, bis(4-butylcyclohexyl) peroxydicarbonate, di(2-ethylhexyl) peroxycarbonate, butyl peroxyneodecanoate, dipropyl peroxydicarbonate, diisopropyl peroxydicarbonate, diethoxyethyl peroxydicarbonate, diethoxyhexyl peroxydicarbonate, hexyl peroxydicarbonate, dimethoxybutyl peroxydicarbonate, bis(3-methoxy-3-methoxybutyl) peroxydicarbonate, dibutyl peroxydicarbonate, dicetyl peroxydicarbonate, dimyristyl peroxydicarbonate, 1,1,3,3-tetramethylbutyl peroxypivalate, hexyl peroxypivalate, butyl peroxypivalate, trimethylhexanoyl peroxide, dimethyl hydroxybutyl peroxyneodecanoate, amyl peroxyneodecanoate, t-butyl peroxy neoheptanoate, amyl peroxypivalate, t-butyl peroxypivalate, t-amyl peroxy-2-ethylhexanoate, lauroyl peroxide, dilauroyl peroxide, di(dodecanoyl) peroxide, benzoyl peroxide, and dibenzoyl peroxide, without being limited thereto. Examples of the redox compound may include mixtures of a peroxide compound and a reductant, without being limited thereto. These azo, peroxide and redox compounds may be used alone or in combination thereof.

The initiator may be present in an amount of about 0.01 parts by weight to about 5 parts by weight, specifically about 0.05 parts by weight to about 3 parts by weight, more specifically about 0.1 parts by weight to about 1 part by weight, based on 100 parts by weight of the monomer mixture forming the hydroxyl group-containing (meth) acrylic copolymer. Within this range, curing can be completely performed, deterioration in transmittance of the adhesive composition due to the residual initiator can be prevented, bubble generation in the adhesive composition can be reduced, and the adhesive composition can have excellent reactivity.

In another embodiment, the pressure-sensitive adhesive composition may further include a silane coupling agent.

The silane coupling agent may include, but not limited thereto, siloxane or epoxy silane coupling agents. The silane coupling agent may be present in an amount of about 0.01 part by weight to about 0.1 part by weight, preferably about 0.05 parts by weight to about 0.1 part by weight based on 100 parts by weight of the (meth)acrylic copolymer having the hydroxyl group. Within this range, it is possible to increase the reliability.

The pressure-sensitive adhesive composition may optionally further include a typical additives such as hardening accelerators, ionic liquids, lithium salts, inorganic fillers, softening agents, molecular weight regulators, antioxidants, anti-aging agents, stabilizers, tackifier resins, modified resins (ex. polyol resins, phenol resins, acryl resins, polyester resins, polyolefin resins, epoxy resins, epoxidated polybutadiene resins, etc.), leveling agents, anti-foaming agents, plasticizers, dyes, pigments (ex. coloring pigments, extender pigments, etc.), treating agents, UV blocking agents, fluorescent whitening agents, dispersants, thermal stabilizers, photostabilizers, UV absorbing agents, antistatic agents, coagulants, lubricants and solvents, and the like.

The pressure-sensitive adhesive composition may further include a non-cured compound.

The pressure-sensitive adhesive composition may have a viscosity of about 300 cPs to about 50,000 cPs at 25° C. Within this range, the pressure-sensitive adhesive composition may have excellent coatability and uniformity of the thickness.

According to the FIG. 1, the flexible display device 100 including the adhesive film according to aspects of the present invention may include a photoelectric element part (91), a first adhesive film (92(a)) formed on the photoelectric element part (91), a touch function part (93) formed on the first adhesive film (92(a)), a second adhesive film (92(b)) formed on the touch function part (93) and a window film (95) formed on the second adhesive film (92(b)).

The photoelectric element part (91) may be any materials as long as they are flexible materials, and be, for example, an OLED, a LED or a LCD including a light source. In some embodiments, a touch function part (93) may be formed on panels of the OLED, the LED or the LCD including the light source in the photoelectric element part (91), and the touch function part (93) may be bonded to a polarizer (94). The adhesive film of the present invention may be interposed between panels of the OLED, the LED or the LCD including the light source and the touch function part (93).

The touch function part (93) may serve to sense electrical signals caused by the contact with fingers, etc., and be formed of flexible materials. Specifically, metal nanowires of flexible conductive materials, and conductors in which the conductive films including the conductive polymers are patterned may be used. For example, the touch function part (93) may include the conductor formed on the substrate layer (not shown). The touch function part (93) may be a typical one, available from the commercial sources. The photoelectric element part (91) may be laminated via the first adhesive film (92(a)) below the touch function part (93).

The window film (95) may be a typical one, available from the commercial sources. In one embodiment, the window film (95) may be optically transparent, formed of the flexible resin, and consisting of a substrate layer and a hard coating layer. The substrate layer may be at least one poly (meth)acrylate resin selected from, for example, a polyester resin such as polyethylene terephthalate, polyethylene naphthalate, polybutylene terephthalate, polybutylene naphthalate, and the like, a polycarbonate resin, a polyimide resin, a polystyrene resin, a polymethyl metacrylate, and the like. In addition, the hard coating layer may have a hardness of 6H or more in the pencil hardness test, and may be formed of siloxane resin.

In one embodiment, the second adhesive film (92(b)) may be the same material as the first adhesive film (92(a)). Here, "same material" means that the components and physical properties are the same. In another embodiment, the second adhesive film (92(b)) may be different material from the first adhesive film (92(a)). In still another embodiment, the thickness of the first adhesive film (92(a)) may be thicker than the second adhesive film (92(b)). Therefore, the first adhesive film (92(a)) may have an adhesion higher than the second adhesive film (92(b)). Thus, it is possible to increase a reliability of the flexible display divice, and flatten the photoelectric element part.

According to the FIG. 2, in another embodiment, the flexible display device (200a, 200b) may further include a polarizer (94) formed on the touch function part (93) or the first adhesive film (92(a)). In one embodiment, the polarizer (94) may be formed on the touch function part (93) in the flexible display device (200a), and the window film (95) may be laminated via the second adhesive film (92(b)) of aspects of the present invention on the touch function part (93). Alternatively, the polarizer (94) may be laminated via the first adhesive film (92(a)) on the photoelectric element part (91) in the flexible display device (200b). In another embodiment, in the flexible display device (200a), the substrate layer of the touch function part (93) may include the polarizer, and in this case, the polarizer and the substrate layer of the touch function part (93) may be integrated.

The polarizer (94) may polarize a natural light or an artificial light, and may be prepared by dying an iodide or a dichromatic dye to a modified polyvinyl alcohol film such as a partial formylated polyvinyl alcohol film, an acetoacetyl group modified polyvinyl alcohol film, and the like or a polyolefin film and stretching it in a fixed direction. Specifically, it may be prepared through a swelling step, a dying step, and a stretching step. Each step will be typically known to those skilled in the art. The polarizer (94) may be any one, available from the commercial sources.

According to the FIG. 3, in still another embodiment, although the touch function part (93) of the flexible display device (300) is not shown, the conductors may be formed on the substrate layer, and the substrate layer may include the polarizer (98).

Next, the present invention will be described in more detail with reference to examples. However, it should be noted that these examples are provided for illustration only and should not be construed in any way as limiting the invention.

A description of details apparent to those skilled in the art will be omitted.

EXAMPLE

Preparation of Adhesive Film

The components used for preparing an adhesive film are as follows:
(A) Monomer mixture:
  (a1) 2-ethylhexyl acrylate (EHA) was used.
  (a2) 4-hydroxybutyl acrylate (HBA) was used.
(B) Organic particles:
  (b1) The organic particles, which had core-shell structures each consisting of a core of polybutyl acrylate (PBA) and a shell of polymethyl methacrylate (PMMA) present in an amount of 40 wt % in the organic particles, and having an average particle diameter of 230 nm and a refractive index ($N_B$) of 1.48, were used.
  (b2) The organic particles, which had core-shell structures each consisting of a core of polybutyl acrylate (PBA) and a shell of polymethyl methacrylate (PMMA) present in an amount of 30 wt % in the organic particles, and having an average particle diameter of 230 nm and a refractive index ($N_B$) of 1.48, were used.
  (b3) The organic particles, which had core-shell structures each consisting of a core of polybutyl acrylate (PBA) and a shell of polymethyl methacrylate (PMMA) present in an amount of 30 wt % in the organic particles, and having an average particle diameter of 130 nm and a refractive index ($N_B$) of 1.48, were used.
  (b4) The organic particles, which had core-shell structures each consisting of a core of poly 2-ethylhexyl acrylate (PEHA) and a shell of polymethyl methacrylate (PMMA) present in an amount of 30 wt % in the organic particles, and having an average particle diameter of 140 nm and a refractive index ($N_B$) of 1.48, were used.
(C) Radical polymerizable initiator:
  (c1) Irgacure 651 (2,2-dimethoxy-2-phenyl acetophenone) product from BASF was used.
  (c2) Irgacure 184 (1-hydroxycyclohexylphenyl ketone) product from BASF was used.
  (c3) AIBN (Azobisisobutyronitrile, Junsei Chemical Co., Ltd.) product as a thermal polymerizable initiator was used.

Preparation Example 1

100 parts by weight of a monomer mixture (A) containing 70 wt % of 2-ethylhexyl acrylate (a1) and 30 wt % of 4-hydroxybutyl acrylate (a2), 4 parts by weight of organic particles (b1) and 0.005 parts by weight of a photo-polymerizable initiator (c1) (Irgacure 651) were mixed in a glass vessel to prepare a mixture. Oxygen dissolved in the glass vessel was replaced with a nitrogen gas, and the mixture was polymerized by irradiating a UV light for few minutes using a low pressure lamp (BL Lamp from Sankyo) to give a (meth)acrylic copolymer having a hydroxyl group having a viscosity of 1000 CPS and a refractive index ($N_{AB}$) shown in Table 1. 0.35 parts by weight of an additional photo-polymerizable initiator (c2) (Irgacure 184) was added to the resultant (meth)acrylic copolymer having the hydroxyl group to obtain the pressure-sensitive adhesive composition.

The pressure-sensitive adhesive composition was coated to the polyester film (release film, polyethylene terephthalate film, thickness of 50 μm) to give an adhesive film having a thickness of 100 μm. The upper side of the polyester film was covered with the release film having a thickness of 75 μm, and both sides were irradiated for six minutes using a low pressure lamp (BL Lamp from Sankyo) to give a transparent adhesive sheet.

Preparation Examples 2 to 7 and 9

The transparent adhesive sheets were prepared in the same manner as in Preparation Example 1 except that the contents of the component in Preparation Example 1 were changed as showed in Table 1.

Preparation Example 8

100 parts by weight of a monomer mixture (A) containing 80 wt % of 2-ethylhexyl acrylate (a1) and 20 wt % of 4-hydroxybutyl acrylate (a2), 4 parts by weight of organic particles (b3) and 0.05 parts by weight of a photo-polymerizable initiator (AIBN (Junsei)), and 130 parts by weight of ethyl acetate based on 100 parts by weight were mixed in a glass vessel. Oxygen dissolved in a glass vessel was replaced with a nitrogen gas, and the mixture was subjected to a typical polymerization to give a (meth)acrylic copolymer having a hydroxyl group having a refractive index ($N_{AB}$) shown in Table 1. 0.35 parts by weight of an additional photo-polymerizable initiator (c2) (Irgacure 184) was added to the resultant (meth)acrylic copolymer having the hydroxyl group to obtain the pressure-sensitive adhesive composition.

Then, a transparent adhesive sheet was prepared using the same method as the Preparation Example 1, and additionally air dried at 80° C. for 20 minutes and at 100° C. for 5 minutes.

The physical properties for the transparent adhesive sheet prepared in Preparation Examples 1 to 9 were determined, and the results thereof were shown in Table 1.

TABLE 1

| | | \multicolumn{9}{c}{Preparation Example} | | | | | | | | |
|---|---|---|---|---|---|---|---|---|---|---|
| | | 1 | 2 | 3 | 4 | 5 | 6 | 7 | 8 | 9 |
| (A) | (a1) | 70 | 70 | 80 | 80 | 80 | 80 | 80 | 80 | 70 |
| | (a2) | 30 | 30 | 20 | 20 | 20 | 20 | 20 | 20 | 30 |
| (B) | (b1) | 4 | — | — | — | 4 | — | | | — |
| | (b2) | — | 4 | — | — | — | 4 | | | |
| | (b3) | — | — | 4 | — | — | — | 2 | 4 | |
| | (b4) | — | — | — | 4 | — | — | | | |
| (Meth)acrylic copolymer having hydroxyl group refractive index ($N_{AB}$) | | 1.47 | 1.47 | 1.48 | 1.48 | 1.48 | 1.48 | 1.48 | 1.48 | 1.47 |
| $\|N_{AB} - N_B\|$ | | 0.01 | 0.01 | 0 | 0 | 0 | 0 | 0 | 0 | — |
| (C) | (c1) | 0.005 | 0.005 | 0.005 | 0.005 | 0.005 | 0.005 | 0.005 | — | 0.005 |
| | (c2) | 0.35 | 0.35 | 0.35 | 0.35 | 0.35 | 0.35 | 0.35 | 0.35 | 0.35 |
| | (c3) | — | — | — | — | — | — | — | 0.05 | — |
| Storage Modulus (KPa) | −20° C. | 130 | 110 | 73 | 61 | 80 | 71 | 74 | 65 | 86 |
| | 25° C. | 34 | 33 | 27 | 28 | 37 | 35 | 27 | 25 | 22 |
| | 80° C. | 18 | 23 | 15 | 18 | 33 | 29 | 14 | 18 | 6 |
| Average slope of −20° C. to 80° C. | | −1.12 | −0.87 | −0.58 | −0.43 | −0.47 | −0.42 | −0.60 | −0.47 | −0.80 |
| T-peel strength (gf/in) | 25° C. | 990 | 943 | 1073 | 881 | 1268 | 944 | 1105 | 984 | 483 |
| | 60° C. | 536 | 532 | 578 | 654 | 561 | 596 | 521 | 587 | 472 |
| Haze (%) | | 0.78 | 0.49 | 0.51 | 0.44 | 0.92 | 0.49 | 0.28 | 0.52 | 0.45 |
| Haze after 200% stretching (%) | | 0.97 | 0.62 | 0.55 | 0.45 | 1.26 | 0.67 | 0.37 | 0.54 | 0.47 |
| Recovery rate (%) | | 79.5 | 78.0 | 67.2 | 49.1 | 82.5 | 74 | 50.0 | 77.5 | 38.4 |
| Foaming area (%) | | 0 | 0 | 0 | 0 | 0 | 0 | 0 | 0 | 2.19 |
| Elongation (%) | | 970 | 1080 | 1580 | 1625 | 1105 | 1380 | 1250 | 1470 | 760 |

Method of Evaluating the Physical Properties (1) Storage modulus: Viscoelasticity was measured at a shear rate of 1 rad/sec at a strain of 1% under auto strain conditions using ARES (MCR-501, Anton Paar Co., Ltd.) which was a dynamic viscoelasticity instrument. After removal of a release film, an adhesive film was stacked to a thickness of 500 μm. Next, the stacked body was subjected to punching using an 8 mm diameter puncher, thereby preparing a specimen. Storage modulus was measured on the specimen at a temperature of −60° C. to 90° C. at a heating rate of 5° C./min using an 8 mm jig, and storage modulus at each of −20° C., 25° C. and 80° C. was recorded.

(2) Average slope: The average slope at −20° C. to 80° C. for the distribution of storage modulus versus temperature of the adhesive film, in which a temperature (° C.) is plotted as x-axis and a storage modulus (KPa) is plotted as y-axis, and is calculated according to Equation 3.

$$\text{Average slope} = (Mo(80° C.) - Mo(-20° C.))/(80-(-20))$$ [Equation 3]

(wherein Equation 3, Mo (80° C.) is a storage modulus (KPa) at 80° C., and Mo (−20° C.) is a storage modulus (KPa) at −20° C.)

(3) T-peel strength: A PET film having a size of 150 mm×25 mm×75 μm (length×width×thickness) was subjected to corona treatment twice (total dose: 156) under corona discharge at a dose of 78 using a corona treatment device. An adhesive film sample having a size of 100 mm×25 mm×100 μm (length×width×thickness) was obtained from each of the adhesive sheets of Examples and Comparative Example. Corona-treated surfaces of the PET films were laminated to both surfaces of the adhesive film sample, thereby preparing a specimen as shown in FIG. 4(a). The specimen was subjected to autoclaving at a pressure of 3.5 bar at 50° C. for 1,000 seconds and secured to a TA.XT_Plus texture analyzer (Stable Micro System Co., Ltd.). Referring to FIG. 4(b), the PET film at one side was kept fixed and the PET film at the other side was pulled at a rate of 50 mm/min at 25° C. using a TA.XT_Plus texture analyzer, thereby measuring T-peel strength at 25° C. (see FIG. 4(b)).

In addition, the PET film at one side was kept fixed and the PET film at the other side was pulled at a rate of 50 mm/min at 60° C. using a TA.XT_Plus texture analyzer, thereby measuring T-peel strength at 60° C.

(4) Haze: Haze meter (Model NDH 5000 from Nippon Denshoku Industries Co., Ltd.) was used. The haze of thickness of 100 μm was determined according to ASTM (American Society for Testing and Measurement) test method D 1003-95 5 ("Standard Test for Haze and Luminous Transmittance of Transparent Plastic").

(5) Haze after 200% stretching: Both ends of a sample (5 cm×5 cm, thickness: 100 μm) of the manufactured adhesive film were secured to both sides of a horizontal tensile tester, followed by removing release films from both surfaces of the sample. After the sample was subjected to 200% stretching in a longitudinal direction (to a length twice an initial length thereof, that is, a length of 10 cm), a glass plate was placed on a lower side of the sample and a release film was placed on an upper side of the sample, followed by bonding the sample to the glass plate through 2 kg rollers, thereby preparing a stretched specimen. Next, the release film was removed from the upper side, followed by measuring haze in the same manner as described above.

(6) Recovery rate: When both ends of each polyethylene terephthalate (PET) film (thickness: 75 μm) having a size of 50 mm×20 mm (length×width) were defined as a first end and a second end, respectively, a specimen was prepared by bonding ends of two PET films to each other via each of the adhesive films, which were prepared in Examples and a Comparative Example and had a size of 20 mm×20 mm (length×width), in order of first end of first PET film/adhesive film/second end of second PET film, and had a contact area of 20 mm×20 mm (length×width) between each of the PET films and the adhesive film (see FIGS. 5(a) and 5 (b)). Referring to FIG. 5(a), jigs were secured to non-bonded ends of the PET films of the specimen at room temperature (25° C.), respectively. Next, the jig at one side was kept fixed, and the jig at the other side was pulled to a length of 1,000% of thickness (unit: μm) of the adhesive film of the adhesive film) at a rate of 300 mm/min and then maintained for 10 seconds. Next, if an increased length of the adhesive film was defined as Xf (unit: μm) when a force of 0 kPa was applied to the adhesive film by recovering the adhesive film at the same rate (300 mm/min) as the pulling rate, recovery rate (%) was calculated by Equation 1.

$$\text{Recovery rate (\%)} = (1-(Xf/X0)) \times 100 \quad \text{[Equation 1]}$$

(7) Elongation (%): The adhesive film of a size of 5 cm×5 cm was rolled closely, and fixed to TA (TA.XT Plus Texture Analyzer (Stable Micro Systems, Ltd)), and then stretched at a rate of 300 mm/min to measure the ratio of the length change.

(8) Foaming area of adhesive film (%): The adhesive film, with PET having a thickness of 50 μm laminated on the one side of the adhesive layer (13 cm×3 cm, thickness 100 μm) and PET having a thickness of 100 μm laminated on the other side of the adhesive layer, was bended and putted into the parallel frames having a spacing of 1 cm in the direction of PET having a thickness of 50 μm such that the width length of the specimen of the adhesive film became ½, and aged at temperature of 70° C. and humidity of 93% for 24 hours. Then, the images of the area, in which the bubbles occur, taken with an optical microscope (Olympus, EX-51, 30×) are analyzed using a Mac-view software from Mountech Co., Ltd., to calculate a ratio (%) of the area and size in which the bubbles occupy to the area of the specimen.

Example 1

The flexible display device (13 cm×3 cm) was prepared by laminating the following layers.

Photoelectric element part: It was replaced with PET (thickness of 100 μm).

First adhesive film: The adhesive film having a thickness of 100 μm was formed from the composition of the Preparation Example 1.

PC film (touch function part) with a transparent electrode applied: The film was prepared by applying the silver nanowire containing solution (Clearohm-A G4-05, Cambrios Technologies Corporation, containing silver nanowire and binder) to Teijin chemical PC film having a thickness of 50 μm.

Second adhesive film: The adhesive film having a thickness of 50 μm was formed from the composition of the Preparation Example 1.

Window film: It was replaced with PET (100 μm Cosmoshine TA015, Toyobo Co., Ltd., thickness: 100 μm).

Examples 2 to 8

The flexible display devices were prepared in the same manner as in Example 1 except that the pressure-sensitive adhesive compositions for preparing the adhesive film in Preparation Examples 2 to 8 were used.

Comparative Example 1

The flexible display device was prepared in the same manner as in Example 1 except that the pressure-sensitive adhesive composition for preparing the adhesive film in Preparation Example 9 was used.

The physical properties for Examples 1 to 8 and Comparative Example 1 were determined, and the results thereof were shown in Table 2.

TABLE 2

|  | Examples | | | | | | | | Comparative Example |
|---|---|---|---|---|---|---|---|---|---|
|  | 1 | 2 | 3 | 4 | 5 | 6 | 7 | 8 | 1 |
| Foaming area (%) | 0 | 0 | 0 | 0 | 0 | 0 | 0 | 0 | 3.22 |

Method of Evaluating the Physical Properties

Foaming area of display device (%): The prepared display devices were bended and putted into the parallel frames having a spacing of 1 cm in the direction of PET (substituted for the photoelectric element part) having a thickness of 100 μm, and aged at temperature of 70° C. and humidity of 93% for 24 hours. Then, the images of the display device taken with an optical microscope (Olympus, EX-51, 30×) was analyzed using a Mac-view software from Mountech Co., Ltd., to calculate a ratio (%) of the area and size in which the bubbles occupy to the total area.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

The invention claimed is:

1. A flexible display device comprising:
a photoelectric element part;
a first adhesive film formed on the photoelectric element part;
a touch function part formed on the first adhesive film;
a second adhesive film formed on the touch function part; and
a window film formed on the second adhesive film;
wherein the first adhesive film or the second adhesive film has an average slope of about −9.9 to about 0 at −20° C. to 80° C. based on x-axis for a distribution of storage modulus versus temperature in a function of x-axis of temperature (° C.) and y-axis of storage modulus (KPa),
wherein the first adhesive film or the second adhesive film has a storage modulus of 10 KPa or more at 80° C., and
wherein the storage modulus is measured at a shear rate of 1 rad/sec.

2. The flexible display device according to claim 1, wherein the flexible display device further comprises a polarizer formed on the touch function part or on the first adhesive film.

3. The flexible display device according to claim 1, wherein the touch function part comprises a substrate layer, and the substrate layer comprises a polarizer.

4. The flexible display device according to claim 1, wherein the photoelectric element part is an OLED, a LED or a LCD comprising a light source.

5. The flexible display device according to claim 1, wherein the first adhesive film has a thickness greater than that of the second adhesive film.

6. The flexible display device according to claim 1, wherein the first adhesive film or the second adhesive film has a T-peel strength of about 400 gf/in to about 5,000 gf/in, as measured at 25° C. with respect to a corona-treated polyethylene terephthalate (PET) film.

7. The flexible display device according to claim 1, wherein the first adhesive film or the second adhesive film has a T-peel strength of about 200 gf/in to about 3,000 gf/in, as measured at 60° C. with respect to a corona-treated polyethylene terephthalate (PET) film.

8. The flexible display device according to claim 1, wherein the first adhesive film or the second adhesive film has a storage modulus of about 10 KPa to about 1000 KPa at −20° C.

9. The flexible display device according to claim 1, wherein the first adhesive film or the second adhesive film has a haze of about 5% or less after 200% stretching at a thickness of 100 μm.

10. The flexible display device according to claim 1, wherein the first adhesive film or the second adhesive film has a recovery rate of about 30% to about 98% at a thickness of 100 μm according to the following Equation 1:

$$\text{Recovery rate (\%)} = (1-(X_f/X_0)) \times 100, \qquad [\text{Equation 1}]$$

where in Equation 1, X0 and Xf are defined as follows: when both ends of each of polyethylene terephthalate (PET) films (thickness: about 75 μm) having a size of about 50 mm× about 20 mm (length×width) are defined as a first end and a second end, respectively, a specimen is prepared by bonding ends of two PET films to each other via an adhesive film having a size of about 20 mm× about 20 mm (length×width) in order of first end of first PET film/adhesive film (length× width: about 20 mm× about 20 mm)/second end of second PET film; next, jigs are secured to non-bonded ends of the PET films of the specimen at about 25° C., respectively; next, the jig at one side is kept fixed and the jig at the other side is pulled to a length of 1,000% of thickness (unit: μm) of the adhesive film) at a rate of about 300 mm/min and then maintained for about 10 seconds; wherein when a force of 0 kPa is applied to the adhesive film by recovering the adhesive film at the same rate (about 300 mm/min) as the pulling rate, an increased length of the adhesive film is defined as Xf (unit: μm)).

11. The flexible display device according to claim 1, wherein the first adhesive film or the second adhesive film has a bubble generation area of about 0%, as measured when the adhesive film (length×width×thickness: about 13 cm× about 3 cm× about 100 μm) comprising a about 50 μm thick PET film stacked on one surface thereof and a about 100 μm thick PET film stacked on the other surface thereof is bent towards the about 50 μm thick PET film such that the adhesive film has about ½ of the length, followed by placing the adhesive film between parallel frames having a gap of about 1 cm, and then subjected to aging under conditions of about 70° C. and humidity of about 93% for about 24 hours.

12. The flexible display device according to claim 1, wherein the first adhesive film or the second adhesive film in the flexible display device has a bubble generation area of about 0%, as measured when the flexible display device that a window film was replaced with PET film (thickness of about 100 μm), bended into parallel frames having a spacing of about 1 cm in a direction of the photoelectric element part, and aging at temperature of about 70° C. and humidity of about 93% for about 24 hours.

13. The flexible display device according to claim 1, wherein the first adhesive film or the second adhesive film is a cured product of a pressure-sensitive adhesive composition, and the pressure-sensitive adhesive composition comprises a monomer mixture for a (meth)acrylic copolymer having a hydroxyl group, and organic particles.

14. The flexible display device according to claim 13, wherein the organic particles have an average particle diameter of about 10 nm to about 400 nm.

15. The flexible display device according to claim 13, wherein the monomer mixture comprise a (meth)acrylate monomer having the hydroxyl group and a comonomer.

16. The flexible display device according to claim 15, wherein the comonomer comprises at least one of an alkyl (meth)acrylate monomer, a monomer having ethylene oxide, a monomer having propylene oxide, a monomer having amine group, a monomer having amide group, a monomer having alkoxy group, a monomer having phosphate group, a monomer having sulfonic acid group, a monomer having phenyl group and a monomer having silane group, and the comonomer has a glass transition temperature (Tg) of about −150° C. to about 0° C. and
wherein the glass transitions temperature is measured utilizing DSC.

17. The flexible display device according to claim 13, wherein the organic particles have core-shell structures, and a glass transition temperature of the core and the shell satisfies the following Equation 2:

$$Tg(c) < Tg(s) \qquad [\text{Equation 2}]$$

wherein, Tg(c) is a glass transition temperature (° C.) of the core, and Tg(s) is a glass transition temperature (° C.) of the shell, and
wherein the glass transitions temperature of the core and the glass transition temperature of the shell are measured utilizing DSC.

18. The flexible display device according to claim 17, wherein the core has a glass transition temperature of about −150° C. to about 10° C., and the shell has a glass transition temperature of about 15° C. to about 150° C.

19. The flexible display device according to claim 17, wherein the core comprises at least one polyalkyl (meth) acrylate having a glass transition temperature of about −150° C. to about 10° C., and the shell comprises at least one polyalkyl (meth)acrylate having a glass transition temperature of about 15° C. to about 150° C.

20. The flexible display device according to claim 17, wherein the shell comprises two or more of layers, and the outermost layer of the organic particles comprises at least one polyalkyl (meth)acrylate having a glass transition temperature of about 15° C. to about 150° C.

21. The flexible display device according to claim 17, wherein the shell is present in an amount of about 1 wt % to about 70 wt % in the organic particles.

22. The flexible display device according to claim 13, wherein the organic particles are present in an amount of about 0.1 parts by weight to about 15 parts by weight based on 100 parts by weight of the monomer mixture containing the (meth)acrylic copolymer having the hydroxyl group.

23. The flexible display device according to claim 13, wherein the organic particles have a refractive index difference of about 0.05 or less from that of the (meth)acrylic copolymer having the hydroxyl group.

24. The flexible display device according to claim 23, wherein the monomer mixture containing the (meth)acrylic copolymer having the hydroxyl group comprises about 60 wt % to about 95 wt % of a comonomer and about 5 wt % to about 40 wt % of the (meth)acrylate monomer having the hydroxyl group.

25. The flexible display device according to claim 13, wherein the pressure-sensitive adhesive composition further comprises at least one of an initiator and a crosslinking agent.

26. A flexible display device comprising:
a photoelectric element part;
a first adhesive film formed on the photoelectric element part;
a touch function part formed on the first adhesive film;
a second adhesive film formed on the touch function part; and
a window film formed on the second adhesive film;
wherein the first adhesive film or the second adhesive film is formed from an pressure-sensitive adhesive composition comprising a monomer mixture for a (meth) acrylic copolymer having a hydroxyl group; and organic particles,
the organic particles have an average particle diameter of about 10 nm to about 400 nm,
wherein the first adhesive film or the second adhesive film has a storage modulus of about 10 KPa to about 1000 KPa at 25° C., and
wherein the storage modulus is measured at a strain of 1% shear rate of 1 rad/sec.

27. The flexible display device according to claim 26, wherein the first adhesive film or the second adhesive film has a storage modulus of about 10 KPa to about 1000 KPa at 80° C., and
wherein the storage modulus is measured at a shear rate of 1 rad/sec.

* * * * *